F. E. BUTLER.
CAR PROPELLER.
APPLICATION FILED AUG. 31, 1912.
1,059,434.
Patented Apr. 22, 1913.
2 SHEETS—SHEET 1.
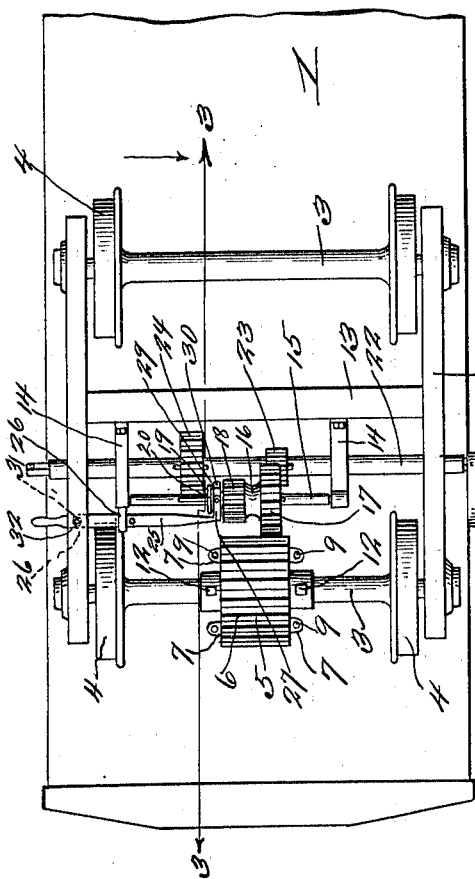
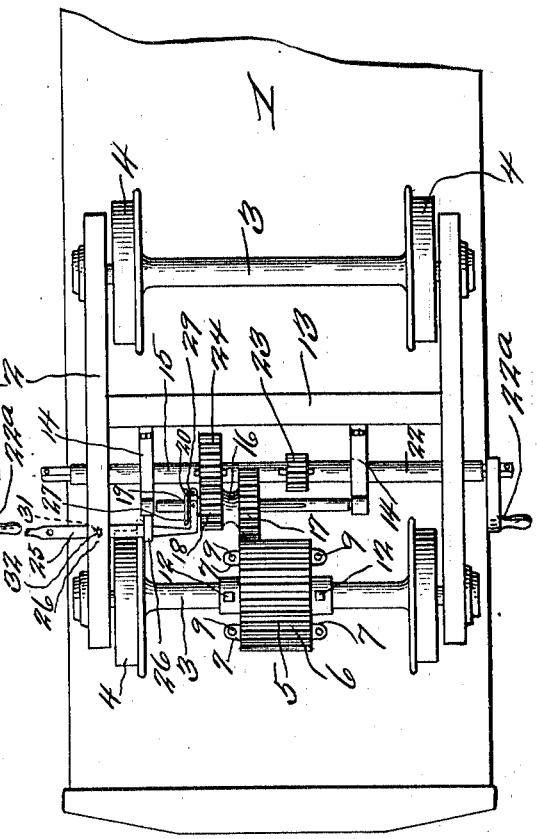
Witnesses
Francis G. Boswell.
Robt. Meyer.
Inventor
F. E. Butler,
By D. Swift & Co.
Attorneys

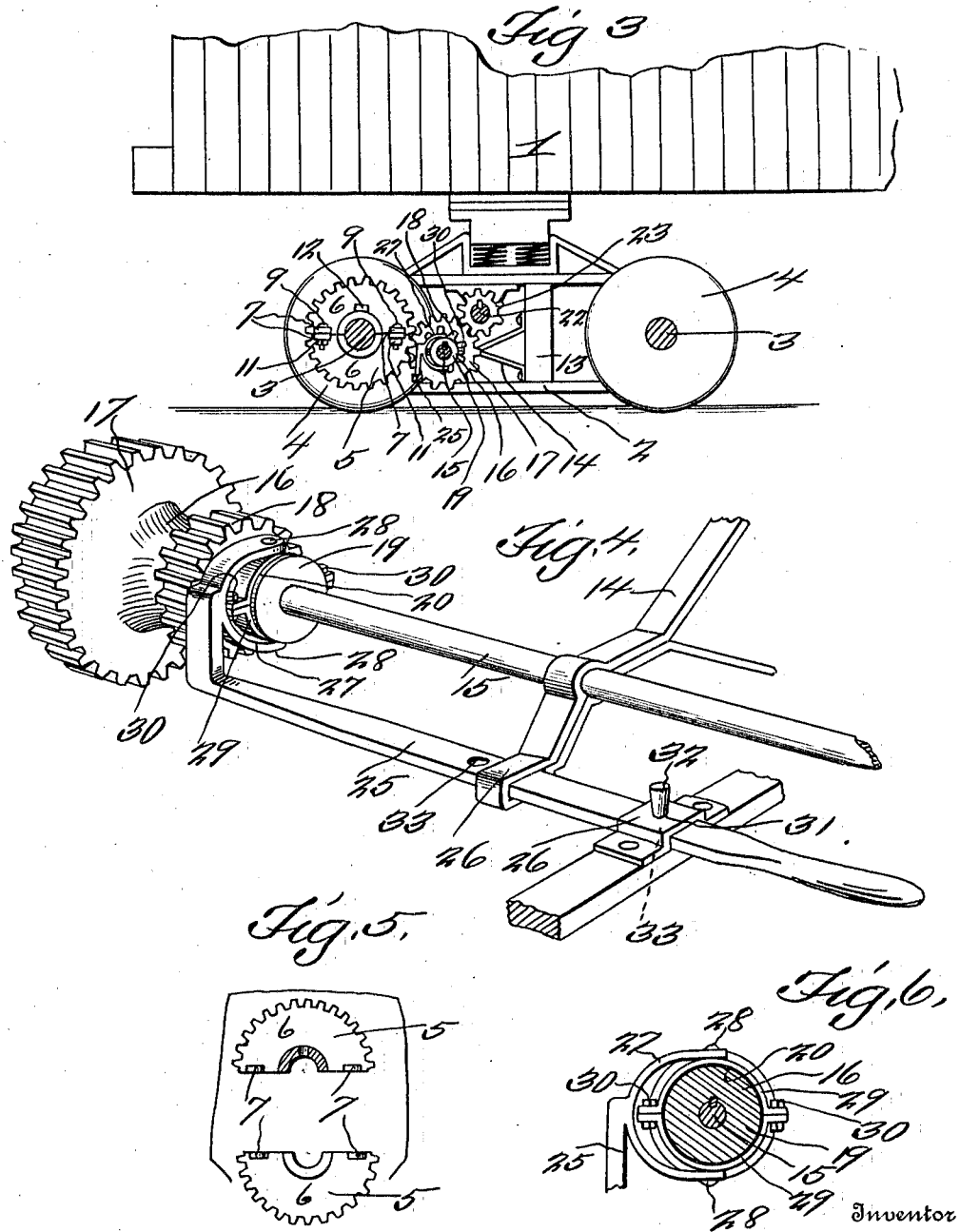

UNITED STATES PATENT OFFICE.

FRANK ELMER BUTLER, OF JOHNSTOWN, PENNSYLVANIA.

CAR-PROPELLER.

1,059,434.  Specification of Letters Patent.  Patented Apr. 22, 1913.

Application filed August 31, 1912. Serial No. 718,167.

*To all whom it may concern:*

Be it known that I, FRANK E. BUTLER, a citizen of the United States, residing at Johnstown, in the county of Cambria and State of Pennsylvania, have invented a new and useful Car-Propeller; and I do hereby declare the following to be a full, clear, and exact description of the invention, such as will enable others skilled in the art to which it appertains to make and use the same.

This invention relates to a car propeller of an improved nature and design, for moving or propelling single railway cars and the like.

The principal object of the invention is the provision of a mechanism which may be applied to the car for rotating one of the axles, without destroying the structure of any part of the car, or without removing any of the structure, in other words, a replaceable mechanism One of the features of the mechanism is the provision of one set of gears operated by a manually operated shaft to mesh with a gear on one of the axles so as to drive the axle at one rate of speed in first starting the car, and after the car has been started the said set of gears may be thrown out of mesh with the gear on the axle, and a second set thrown in mesh with the gear of the axle, so as to increase the motion of the gear of said axle, which will increase the motion of the car wheel.

The invention comprises further features and combination of parts, as hereinafter set forth, shown in the drawings and claimed.

In the drawings:—Figure 1 is a bottom plan view of a railway car showing the equipment of the improved car propeller. Fig. 2 is a similar view showing a different set of gears in mesh with the gear on one of the axles of the car. Fig. 3 is a sectional view on line 3—3 of Fig. 1. Fig. 4 is a detail view of the inter-changeable sets of gears. Fig. 5 is a detail view of the split gear carried by one of the axles. Fig. 6 is a transverse sectional view through the extension 19 of the member 16, showing the groove 20 with the two part collar 29 therein.

Referring to the drawings 1 designates a portion of the body of a car, while 2 denotes the trucks, whereas 3 designates the axles, and 4 the wheels.

A gear wheel 5 is provided, which is constructed in two parts 6, each having ears 7. The two parts 6 of the gear are provided with semi-annular extensions, one extending laterally from each side of each part, and when the two parts are fitted to one of the axles 3 in the manner shown, a complete annular hub for the gear wheel is formed. When the two parts of the wheel are fitted to one of the axles, bolts 9 are passed through the registering ears 10, and are applied with nuts 11. Pins 12 are threaded through the semi-annular extensions, and into the axle, in order to cause the gear wheel 5 to rotate therewith.

Secured to a beam 13 of the truck is a pair of bracket bearings 14, in which a shaft 15 is journaled. Keyed to the shaft 15 to slide thereon is a member 16 constructed with two gears 17 and 18, and an extension 19, which is formed or constructed with an annular groove 20. The gears 17 and 18 are of different diameters, and the gear 17 always remains in mesh with the gear on the axle, except when the car is standing still, and there is no desire to propel the car forwardly. Mounted in bearings of the truck frame is a second shaft 22, having a pair of gears 23 and 24, which rotate with the shaft 22. The gear 23 is of smaller diameter than the gear 24. To first start the car in motion, the member 16 is shifted so that the gear 17 will mesh with the gears 5 and 23. After motion has been imparted to the car, the gear 17 is thrown out of mesh with the gear 23, then the member 16 is shifted so that the gear 18 will mesh with the gear 24. In this manner the motion of the car will be increased. A crank is adapted to be connected with the shaft 22, so as to impart motion to the same. When the member 16 is shifted to increase the motion of the car the gear 17 remains in mesh with the gear 5, but out of mesh with the gear 23. To shift the member 16 a lever 25 mounted in guides 26 having a two part fork 27 (the ends of which fork are pivoted at 28 to a two part collar 29) is provided. The two part collar 29 is secured by the bolts 30 (which pass through the ears of the two parts of the collar) in the groove 20 of the member 16, so that the member 16 may rotate freely with the shaft 15. One of the guides in which the lever 25 is mounted is provided with an aperture 31 to receive a pin 32, which is adapted to enter any one of the two apertures 33, so as to hold the member 16 in shifted positions.

From the foregoing it will be noted there has been devised a car propeller in which a certain rate of speed may be imparted to the car, which subsequently may be increased, and furthermore one which has been found desirable and practical.

The invention having been set forth, what is claimed as new and useful is:—

1. An attachable and detachable propelling mechanism for a railway car, comprising a detachable two part gear adapted to be fixed to one of the axles of the car, a shaft mounted in bearings of the car, a member keyed to but slidable on the shaft having two gears of different diameters and provided with an annular groove, a second shaft mounted in bearings of the car and provided with two gears of different diameters, and means having connections with said groove for shifting the member for changing the meshing of the gears of the first and second shafts.

2. An attachable and detachable propelling mechanism for a railway car, comprising a detachable two part gear adapted to be fixed to one of the axles of the car, a shaft mounted in bearings of the car, a member keyed to but slidable on the shaft having two gears of different diameters and provided with an annular groove, a second shaft mounted in bearings of the car and provided with two gears of different diameters, a two part collar arranged in the groove of said member, a lever having a two part fork connected to the collar, guides for the lever, and means penetrable through one of the guides and the lever for holding the member in shifted positions.

In testimony whereof I have signed my name to this specification in the presence of two subscribing witnesses.

FRANK ELMER BUTLER.

Witnesses:
R. R. MAST,
Mrs. F. E. BUTLER.

---

Copies of this patent may be obtained for five cents each, by addressing the "Commissioner of Patents, Washington, D. C."